United States Patent
Hosokawa et al.

(10) Patent No.: US 10,444,326 B2
(45) Date of Patent: Oct. 15, 2019

(54) FMCW RADAR

(71) Applicant: SOCIONEXT INC., Kanagawa (JP)

(72) Inventors: Yoshifumi Hosokawa, Suita (JP); Isao Imazeki, Ibaraki (JP); Yoichi Nagaso, Hirakata (JP)

(73) Assignee: SOCIONEXT INC., Kanagawa (JP)

( * ) Notice: Subject to any disclaimer, the term of this patent is extended or adjusted under 35 U.S.C. 154(b) by 342 days.

(21) Appl. No.: 15/443,423

(22) Filed: Feb. 27, 2017

(65) Prior Publication Data
US 2017/0168140 A1 Jun. 15, 2017

Related U.S. Application Data

(63) Continuation of application No. PCT/JP2015/003062, filed on Jun. 18, 2015.

(30) Foreign Application Priority Data

Aug. 28, 2014 (JP) ................. 2014-173729

(51) Int. Cl.
 *G01S 7/35* (2006.01)
 *H04B 1/525* (2015.01)
 (Continued)

(52) U.S. Cl.
 CPC ............. *G01S 7/354* (2013.01); *G01S 7/40* (2013.01); *G01S 13/34* (2013.01); *H04B 1/525* (2013.01);
 (Continued)

(58) Field of Classification Search
 CPC .......... H04B 1/525; H04B 1/123; H04B 1/48; H04B 2001/485; H04B 1/0475;
 (Continued)

(56) References Cited

U.S. PATENT DOCUMENTS 7,772,997 B2 * 8/2010 Frederick ............. G06K 7/0008
  235/375
8,233,872 B2 * 7/2012 Nagai ..................... H04B 1/126
  455/278.1

(Continued)

FOREIGN PATENT DOCUMENTS

JP  H11-183600 A  7/1999
JP  2007-071751 A  3/2007

(Continued)

OTHER PUBLICATIONS

International Search Report and Written Opinion dated Sep. 15, 2015 issued in International Patent Application No. PCT/JP2015/003062 (with partial English translation).

*Primary Examiner* — Olumide Ajibade Akonai
(74) *Attorney, Agent, or Firm* — McDermott Will & Emery LLP

(57) ABSTRACT

Disclosed herein is a frequency modulated continuous wave (FMCW) radar. The FMCW radar includes: a transmission signal generator that generates a frequency-modulated transmission signal; a transmission signal sender that sends the transmission signal; a receiver that receives a reflected wave of the transmission signal; an adjuster that adjusts the amplitude and phase of a cancel signal, which cancels a leakage signal component in a received signal, in accordance with a variation in the frequency of the transmission signal; and a superimposer that superimposes the cancel signal over the received signal to cancel the leakage signal component.

15 Claims, 4 Drawing Sheets

(51) Int. Cl.
*G01S 7/40* (2006.01)
*G01S 13/34* (2006.01)
*H04B 1/04* (2006.01)
*G01S 7/03* (2006.01)
*H04B 1/12* (2006.01)

(52) U.S. Cl.
CPC ............ *G01S 7/038* (2013.01); *H04B 1/0475* (2013.01); *H04B 1/123* (2013.01)

(58) Field of Classification Search
CPC .......... G01S 7/038; G01S 7/35; G01S 7/2813; H04L 5/14
See application file for complete search history.

(56) References Cited

U.S. PATENT DOCUMENTS

| | | | | |
|---|---|---|---|---|
| 9,331,735 B1* | 5/2016 | Margomenos | .......... | H04B 1/525 |
| 9,739,871 B2* | 8/2017 | Obiya | .................... | H04B 1/525 |
| 2002/0072344 A1* | 6/2002 | Souissi | ................. | H04B 1/123 |
| | | | | 455/296 |
| 2006/0198429 A1* | 9/2006 | Huang | ................... | H04B 1/525 |
| | | | | 375/219 |
| 2007/0085727 A1 | 4/2007 | Backes et al. | | |
| 2008/0041953 A1* | 2/2008 | Frederick | ............. | G06K 7/0008 |
| | | | | 235/451 |
| 2009/0130981 A1 | 5/2009 | Nagai et al. | | |
| 2009/0213770 A1* | 8/2009 | Mu | ........................ | H04B 1/123 |
| | | | | 370/281 |
| 2009/0232260 A1* | 9/2009 | Hayashi | ................... | G01S 7/038 |
| | | | | 375/346 |
| 2012/0112956 A1 | 5/2012 | Trotta et al. | | |
| 2012/0249363 A1* | 10/2012 | Kolinko | ............... | H01Q 19/175 |
| | | | | 342/179 |
| 2013/0102254 A1* | 4/2013 | Cyzs | ..................... | H04B 1/126 |
| | | | | 455/63.1 |
| 2014/0220908 A1* | 8/2014 | Loh | ........................ | H04B 1/40 |
| | | | | 455/78 |
| 2014/0315501 A1* | 10/2014 | Rudell | ................ | H04B 1/0458 |
| | | | | 455/78 |

FOREIGN PATENT DOCUMENTS

| | | |
|---|---|---|
| JP | 2007-281592 A | 10/2007 |
| JP | 2012-533255 A | 12/2012 |

* cited by examiner

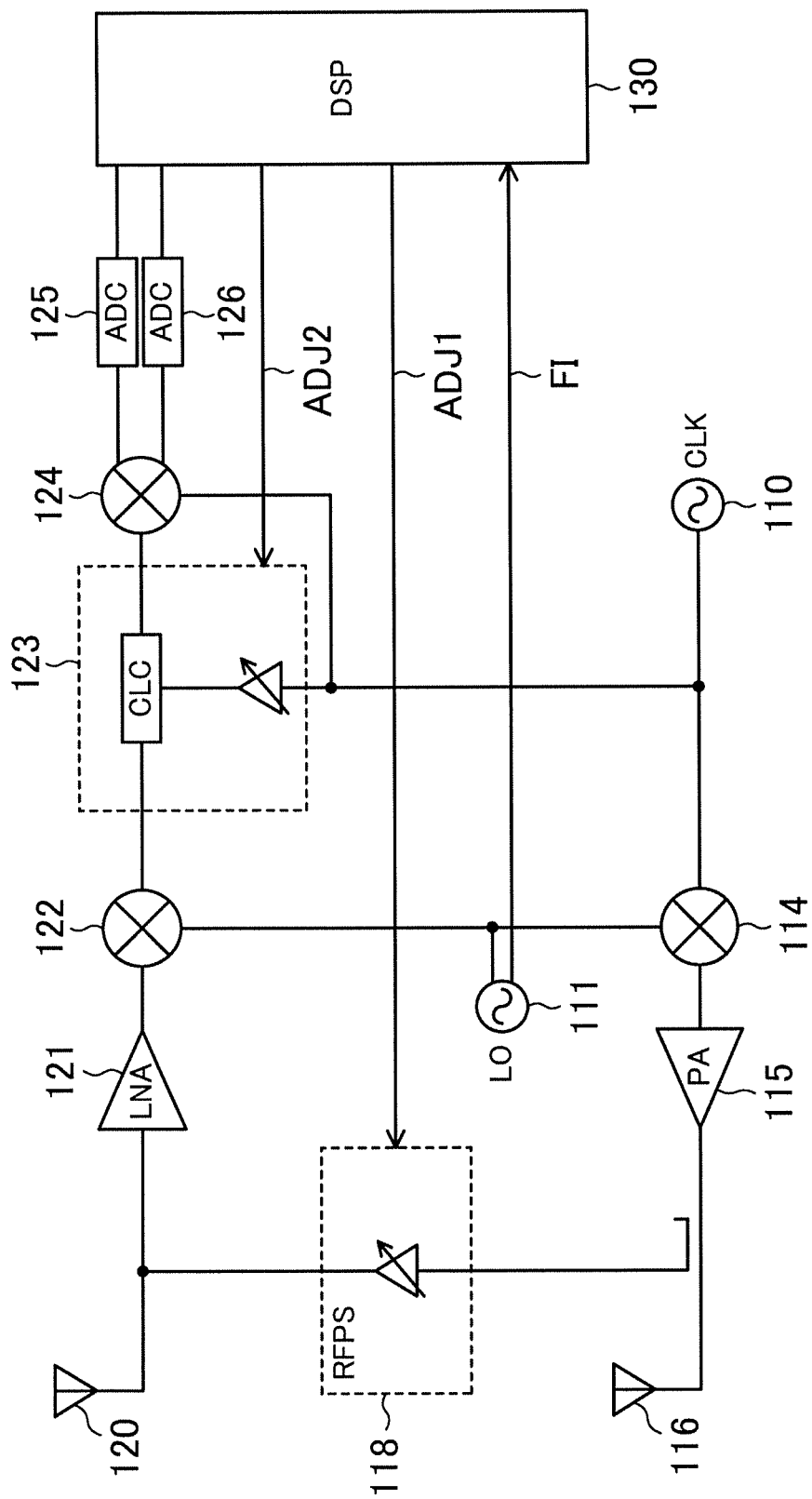

FMCW RADAR

CROSS-REFERENCE TO RELATED APPLICATIONS

This is a continuation of International Application No. PCT/JP2015/003062 filed on Jun. 18, 2015, which claims priority to Japanese Patent Application No. 2014-173729 filed on Aug. 28, 2014. The entire disclosures of these applications are hereby incorporated by reference.

BACKGROUND

The present disclosure relates to a frequency modulated continuous wave (FMCW) radar.

An FMCW radar is known as a type of distance measuring radar. An FMCW radar continuously transmits a signal with a frequency varying with time, and receives a reflected wave from an object. The radar can measure the distance to the object and its moving velocity by analyzing the reflected wave. Such a radar includes a transmission system and a reception system. In a radar of this type, however, a signal sometimes leaks from the transmission system to the reception system, resulting in a lower measurement precision. In particular, as a circuit with such a radar decreases its overall size, the distance between the transmission and reception systems also decreases. As a result, the leakage signal comes to have an even more significant negative effect on its performance.

According to a known technique, a receiver supplies an FM signal to a mixer through a delay device causing the same amount of time delay as that of a leakage signal component from a transmission system to a reception system, thereby converting the leakage signal component into a direct-current (DC) component. Then, the receiver further removes the DC component to attempt to cancel the leakage signal component (see Japanese Unexamined Patent Publication No. H11-183600).

SUMMARY

Actually, the amplitude and phase of the leakage signal component from the transmission system to the reception system change as the transmission frequency changes. Thus, according to the known technique, the leakage signal component remains as an alternating current (AC) signal having the same period as one period of variation of the transmission frequency. This makes it impossible for a DC component removal circuit to totally cancel the leakage signal component. Furthermore, the precision of short-distance measurement, in particular, tends to decline disadvantageously, because the removal of the DC component actually involves removal of low frequency components near the DC components.

It is therefore an object of the present disclosure to provide an FMCW radar having the ability to effectively prevent the leakage signal from affecting the measurement precision, even if the transmission and reception systems are arranged close to each other, and to precisely measure the distance to the object, no matter how short it may be, even if the amplitude and phase of the leakage signal vary with the transmission frequency, in particular.

To achieve this object, an FMCW radar according to an aspect of the present disclosure includes: a transmission signal generator configured to generate a frequency-modulated transmission signal; a transmission signal sender configured to send the transmission signal; a receiver configured to receive a reflected wave of the transmission signal; an adjuster configured to adjust an amplitude and phase of a cancel signal, which cancels a leakage signal component in a received signal, in accordance with a variation in a frequency of the transmission signal; and a superimposer configured to superimpose the cancel signal over the received signal to cancel the leakage signal component.

According to this aspect of the present disclosure, the amplitude and phase of a cancel signal, which cancels a leakage signal component in a received signal, are adjusted in accordance with a variation in the frequency of a transmission signal. Thus, the present disclosure provides an FMCW radar having the ability to effectively prevent the leakage signal from affecting the measurement precision, even if the transmission and reception systems are arranged close to each other, and to precisely measure the distance to the object, no matter how short it may be, even if the amplitude and phase of the leakage signal vary with the transmission frequency, in particular.

BRIEF DESCRIPTION OF THE DRAWINGS

FIG. 5 is a block diagram of an FMCW radar according to a variation of the exemplary embodiment shown in FIG. 1.

DETAILED DESCRIPTION

Embodiments of the present disclosure will now be described in detail with reference to the accompanying drawings.

Figure 1:
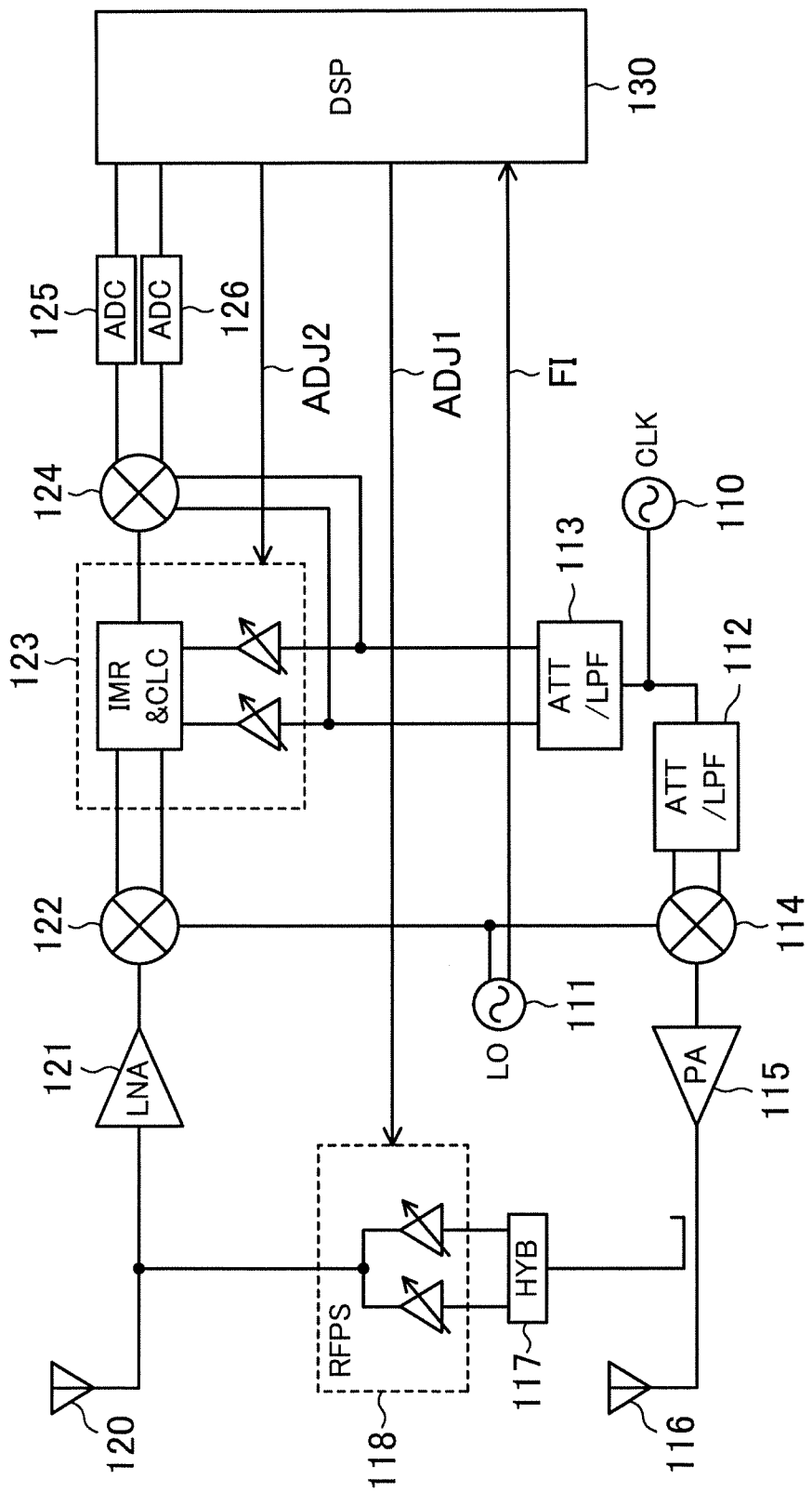
FIG. 1 is a block diagram of an FMCW radar according to an exemplary embodiment of the present disclosure.

FIG. 1 is a block diagram of an FMCW radar according to an exemplary embodiment of the present disclosure. The FMCW radar shown in FIG. 1 is designed to adjust, in accordance with a variation in the frequency of a transmission signal, the amplitude and phase of a cancel signal for cancelling a leakage signal component (a clutter signal component) from a transmission system to a reception system. The FMCW radar includes a reference (clock) signal generator (CLK) 110, a local oscillator (LO) 111, first and second attenuators/low pass filters (ATTs/LPFs) 112, 113, a first mixer 114, a power amplifier (PA) 115, a transmission antenna 116, a hybrid (HYB) circuit 117, a radio frequency phase shift (RFPS) circuit 118, a reception antenna 120, a low noise amplifier (LNA) 121, a second mixer 122, an image rejection and clutter cancellation (IMR & CLC) circuit 123, an intermediate frequency (IF) mixer 124, analog-to-digital converters (ADCs) 125, 126, and a digital signal processor (DSP) 130.

The CLK 110 generates a reference signal for generating a transmission signal. The first ATT/LPF 112 supplies, to the first mixer 114, the reference signal separated into in-phase (I) and quadrature (Q) components. The second ATT/LPF 113 supplies, to each of the IMR & CLC circuit 123 and the IF mixer 124, the reference signal separated into I and Q components. The LO 111 supplies, to the first and second mixers 114, 122, a frequency-modulated local oscillation signal, and sequentially supplies, to the DSP 130, pieces of frequency information FI indicating frequencies at respective points in time during frequency sweeping. The first mixer 114 upconverts the reference signal into an RF signal, based on the associated frequency-modulated local oscillation signal, thereby generating a frequency-modulated transmission signal. The PA 115 amplifies the RF signal from the first mixer 114 to transmit the frequency-modulated transmission signal to the transmission antenna 116. The transmission antenna 116 radiates an electromagnetic wave toward an object.

The reception antenna 120 receives a reflected wave of the frequency-modulated transmission signal from the object, and receives a clutter signal component leaking from the transmission antenna 116. On the other hand, the HYB circuit 117 has an input capacitively coupled to the output of the PA 115, and separates the transmission signal, which is a single signal, into I and Q signal components having a phase difference of 90°. The RFPS circuit 118 adjusts, in accordance with a first adjustment value ADJ1 supplied from the DSP 130 based on the frequency information FI, the amplitude of each of the I and Q signal components supplied from the HYB circuit 117, thereby generating a cancel signal having an opposite phase to the clutter signal component. That is to say, the cancel signal is adjusted, for each frequency, to have the same amplitude as, and an opposite phase to, the clutter signal component. The RFPS circuit 118 has an output connected to the input of the LNA 121, where the cancel signal is superimposed over a received signal to cancel the clutter signal component.

The LNA 121 amplifies the received signal including the clutter signal component that may partially remain. The second mixer 122 downconverts the received signal into an intermediate frequency (IF) signal separated into I and Q signal components, based on the associated frequency-modulated local oscillation signal. The IMR & CLC circuit 123 provides image rejection, generates a cancel signal having an opposite phase to the clutter signal component in accordance with a second adjustment value ADJ2 supplied from the DSP 130 based on the frequency information FI, and superimposes the cancel signal over the received signal to cancel the clutter signal component. The IF mixer 124 downconverts the received signal from which the clutter signal component has been removed. The first and second ADCs 125 and 126 each convert the output of the IF mixer 124, separated into I and Q signal components, into a digital signal, and then passes it to the DSP 130. The DSP 130 calculates the distance to the object and the moving velocity of the object by analyzing the reflected wave from the object based on the outputs of the first and second ADCs 125 and 126.

The DSP 130 operates in a calibration mode prior to the foregoing normal operation. For example, in a calibration mode for the RFPS circuit 118, the DSP 130 stores, as a correction value in its internal memory, the first adjustment value ADJ1 that is set such that the input level to the DSP 130 becomes minimum with no reflected wave input from the object. This correction value corresponds to one of the pieces of frequency information FI received from the LO 111 at this point in time. During the normal operation, the RFPS circuit 118 may be appropriately adjusted based on the first adjustment value ADJ1 derived from the correction value in the memory. The calibration may be performed again either regularly or irregularly, not only during an initial stage. The correction value may also be obtained sporadically at only some points in time in accordance with a variation in transmission frequency. In the interval between those points in time, an interpolation (e.g., a linear interpolation) may be performed to obtain the correction value. A value obtained by performing an arithmetic operation on (e.g., by calculating a moving average of) the results of calibrations that have been carried out regularly or irregularly a number of times may be used as the correction value. The above statement applies not only to the RFPS circuit 118 but also to the IMR & CLC circuit 123. Furthermore, if the clutter signal component is suppressed by both of the RFPS circuit 118 and the IMR & CLC circuit 123, a calibration mode of operation for the RFPS circuit 118 is initially performed, where no cancel signal is output from the IMR & CLC circuit 123. Next, a calibration mode of operation for the IMR & CLC circuit 123 is performed, where the RFPS circuit 118 outputs a cancel signal in accordance with the first adjustment value ADJ1 obtained during the calibration mode of operation previously performed. This allows the IMR & CLC circuit 123 to cancel the clutter signal component that has not been completely suppressed by the RFPS circuit 118.

Figure 2:
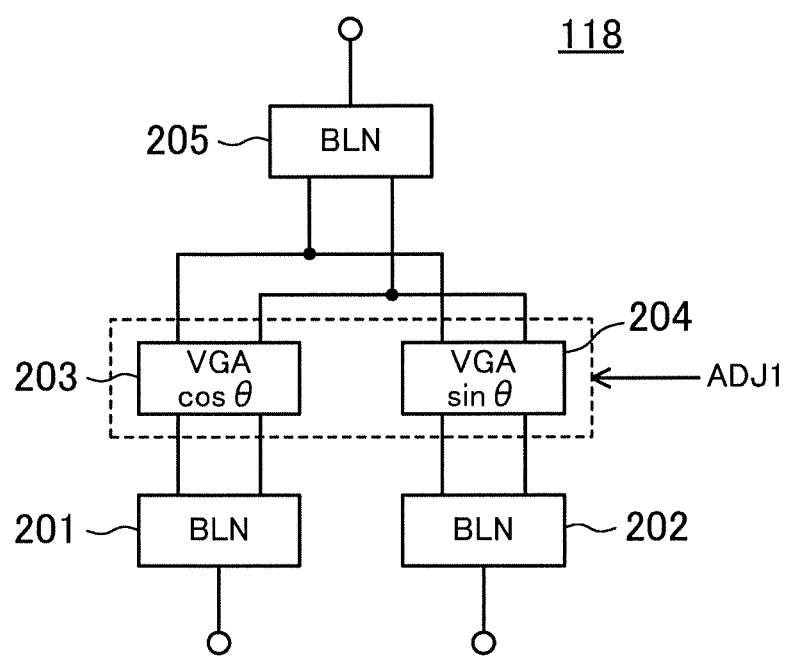
FIG. 2 is a block diagram showing an exemplary detailed configuration for a radio frequency phase shift (RFPS) circuit shown in FIG. 1.

FIG. 2 shows an exemplary detailed configuration for the RFPS circuit 118 shown in FIG. 1. The RFPS circuit 118 shown in FIG. 2 includes two balanced-unbalanced converters (baluns (BLNs)) 201, 202 on its input end, two variable gain amplifiers (VGAs) 203, 204, and one balun (BLN) 205 on its output end. The two BLNs 201, 202 each convert an associated one of the I and Q signal components, which are two single signal components, into a differential pair of signal components. Then, one of the VGAs, i.e., the VGA 203, amplifies the differential pair of I signal components, while the other VGA, i.e., the VGA 204, amplifies the differential pair of Q signal components. At this time, the amplitudes of the two outputs of each of these VGAs 203, 204 are adjusted in accordance with the first adjustment value ADJ1. When finally passing through the BLN 205, these two pairs of amplified I and Q signal components are superimposed one over the other, thereby obtaining a single output signal. In this embodiment, the baluns and the variable gain amplifiers for two differential pairs of signal components are used. However, variable gain amplifiers for single signal components may be used without using baluns.

Figure 3:
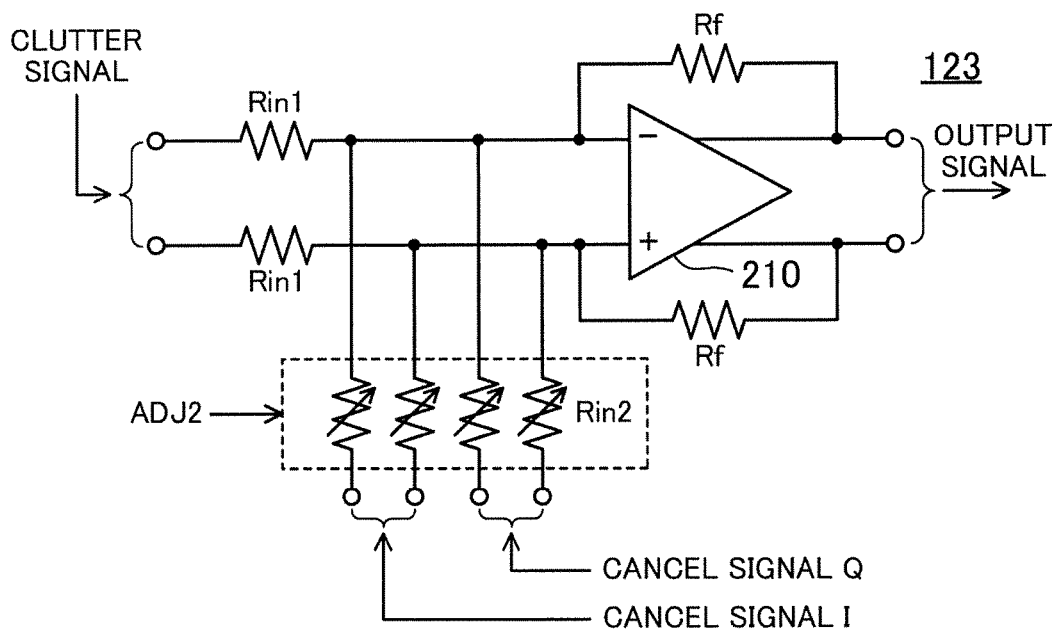
FIG. 3 is a block diagram showing an exemplary detailed configuration for a clutter cancellation (CLC) section of an image rejection and clutter cancellation (IMR & CLC) circuit shown in FIG. 1.
Figure 4:
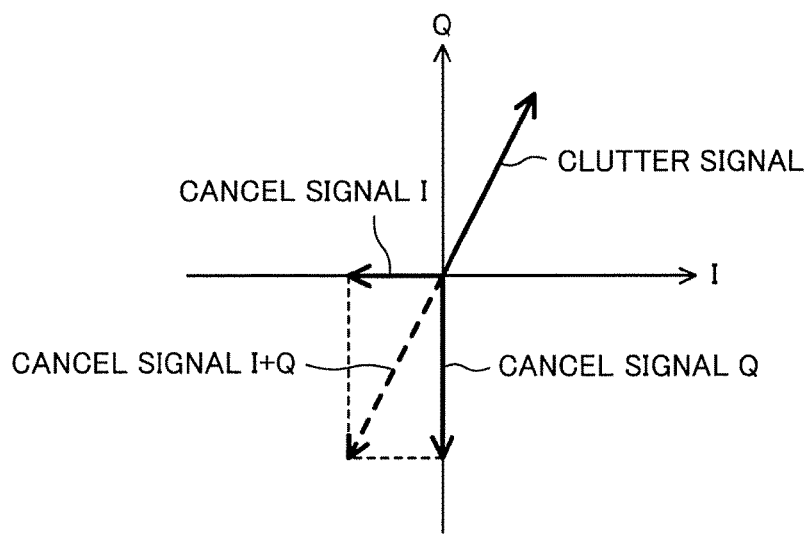
FIG. 4 is a vector diagram describing how the CLC section shown in FIG. 3 operates.

FIG. 3 shows an exemplary detailed configuration for a CLC section of the IMR & CLC circuit 123 shown in FIG. 1. The CLC section shown in FIG. 3 includes an operational amplifier 210 serving as an inverting amplifier, first input resistors Rin1, second input resistors Rin2, and feedback resistors Rf, and synthesizes signals together at a virtual ground node. The second input resistors Rin2 each have a variable resistance value, which is adjusted in accordance with the second adjustment value ADJ2, thereby controlling the respective amplitudes of the cancel signals I and Q. Adjusting the respective amplitudes of these cancel signals I and Q as described above allows this CLC section to produce a cancel signal I+Q having the same amplitude as, and an opposite phase to, the clutter signal component as shown in FIG. 4.

As can be seen from the foregoing description, the configuration shown in FIG. 1 may curb a decline in the precision of the distance measured, no matter how short it may be, even if a variation in the transmission frequency has triggered a variation in the amplitude and phase of the clutter signal component. In addition, the RFPS circuit 118 and the IMR & CLC circuit 123 may adjust the amplitude and phase of the cancel signal simply by adjusting only the respective amplitudes of the I and Q signal components. This may conveniently reduce the circuit size.

Optionally, only one of the RFPS circuit 118 or IMR & CLC circuit 123 shown in FIG. 1 may be implemented. The RFPS circuit 118 is closer to the reception antenna 120 than the IMR & CLC circuit 123, and therefore, more effectively cancels the clutter signal component. This reduces the power input to the LNA 121 and the second mixer 122, thus alleviating the distortion characteristic. Nevertheless, the IMR & CLC circuit 123 operates in a lower frequency range and therefore, makes the cancellation control easier, than the RFPS circuit 118 does, which is beneficial. Alternatively, the output of the RFPS circuit 118 may be connected between the LNA 121 and the second mixer 122.

Instead of the LO 111, the CLK 110 may perform the frequency sweeping. In that case, not the frequency information FI of the LO 111 but frequency information of the CLK 110 is provided for the DSP 130, which supplies the adjustment values ADJ1, ADJ2 in accordance with this frequency information.

FIG. 5 is a block diagram of an FMCW radar according to a variation of the embodiment shown in FIG. 1, and shows an example in which the reference signal is not separated into I and Q signal components. In FIG. 5, the IMR & CLC circuit 123 shown in FIG. 1 is replaced with a simple CLC circuit 123. In addition, the configuration shown in FIG. 5 needs neither the ATTs/LPFs 112, 113 nor the HYB circuit 117 unlike the configuration shown in FIG. 1.

For both of the configurations shown in FIGS. 1 and 5, all of the circuit elements but the transmission antenna 116 and the reception antenna 120 may be integrated together in a single chip.

As can be seen from the foregoing description, the FMCW radar according to an exemplary embodiment of the present disclosure updates the cancel signal in accordance with a variation in the transmission frequency, thus allowing the cancel signal to follow the variation pattern of the clutter signal component. This may effectively prevent the precision of the distance measured from declining, even if the transmission and reception systems are arranged close to each other.

What is claimed is:

1. An FMCW radar comprising:
a transmission signal generator configured to generate a frequency-modulated transmission signal;
a transmission signal sender configured to sends the transmission signal;
a receiver configured to receive a reflected wave of the transmission signal;
an adjuster configured to adjust an amplitude and phase of a cancel signal, which cancels a leakage signal component in a received signal, in accordance with a variation in frequency of the transmission signal; and
a superimposer configured to superimpose the cancel signal over the received signal to cancel the leakage signal component,
wherein the adjuster updates the cancel signal in synchronization with the variation in the frequency of the transmission signal, based on pre-acquired correction data, and
the adjuster performs a linear interpolation on the pre-acquired correction data, thereby creating correction data for use to update the cancel signal.

2. The FMCW radar of claim 1, wherein
the receiver includes a low noise amplifier, and
the superimposer performs the superimposition at a stage preceding the low noise amplifier.

3. The FMCW radar of claim 1, wherein
the receiver includes a mixer for frequency conversion, and
the superimposer performs the superimposition at a stage following the mixer.

4. The FMCW radar of claim 1, wherein
the receiver includes a low noise amplifier, and a mixer for frequency conversion, and
the superimposer performs the superimposition at an intermediate stage between the low noise amplifier and the mixer.

5. The FMCW radar of claim 1, wherein the adjuster adjusts respective amplitudes of I and Q signal components into which the cancel signal has been separated and which have a phase difference of 90°.

6. The FMCW radar of claim 1, wherein the transmission signal generator, the transmission signal sender, the receiver, the adjuster, and the superimposer are all integrated together in a single chip.

7. An FMCW radar comprising:
a transmission signal generator configured to generate a frequency-modulated transmission signal;
a transmission signal sender configured to send the transmission signal;
a receiver including a mixer for frequency conversion and configured to receive a reflected wave of the transmission signal;
an adjuster configured to adjust an amplitude and phase of each of first and second cancel signals, which each cancel a leakage signal component in a received signal, in accordance with a variation in frequency of the transmission signal;
a first superimposer configured to superimpose the first cancel signal over the received signal at a stage preceding the mixer; and
a second superimposer configured to superimpose the second cancel signal over an output of the mixer at a stage following the mixer.

8. The FMCW radar of claim 7, wherein
the receiver includes a low noise amplifier at the stage preceding the mixer, and
the first superimposer superimposes the first cancel signal at a stage preceding the low noise amplifier.

9. The FMCW radar of claim 7, wherein
the receiver includes a low noise amplifier at the stage preceding the mixer, and
the first superimposer superimposes the first cancel signal at an intermediate stage between the low noise amplifier and the mixer.

10. The FMCW radar of claim 7, wherein the adjuster adjusts respective amplitudes of I and Q signal components into which each of the first and second cancel signals has been separated and which have a phase difference of 90°.

11. The FMCW radar of claim 7, wherein the adjuster updates the first and second cancel signals in synchronization with the variation in the frequency of the transmission signal, based on pre-acquired correction data.

12. The FMCW radar of claim 11, wherein the adjuster performs a linear interpolation on the pre-acquired correction data, thereby creating correction data for use to update the first and second cancel signals.

13. The FMCW radar of claim 11, wherein the adjuster averages the pre-acquired correction data, thereby creating correction data for use to update the first and second cancel signals.

14. The FMCW radar of claim 11, wherein the adjuster regularly acquires the correction data.

15. The FMCW radar of claim 7, wherein the transmission signal generator, the transmission signal sender, the receiver, the adjuster, and the first and second superimposers are all integrated together in a single chip.

\* \* \* \* \*